(12) United States Patent  
Guldenpfennig et al.

(10) Patent No.: US 7,681,387 B2
(45) Date of Patent: Mar. 23, 2010

(54) TILT OUT CORN HEAD END FENDER

(75) Inventors: Lee Everett Guldenpfennig, East Moline, IL (US); Troy Allen Kost, LeClaire, IA (US); Michael Wayne Mossman, Silvis, IL (US); Timothy Franklin Christensen, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/928,878

(22) Filed: Oct. 30, 2007

(65) Prior Publication Data

US 2009/0025354 A1    Jan. 29, 2009

(51) Int. Cl.
*A01D 23/02*    (2006.01)
(52) U.S. Cl. ............................................... 56/119
(58) Field of Classification Search ............ 56/119, 56/109, 314, 319, 105, 51
See application file for complete search history.

(56) References Cited

U.S. PATENT DOCUMENTS

| 4,493,181 | A | * | 1/1985 | Glendenning et al. | 56/314 |
| 4,538,404 | A | * | 9/1985 | Heimark et al. | 56/314 |
| 4,553,379 | A | * | 11/1985 | Kalverkamp | 56/60 |
| 4,700,537 | A | * | 10/1987 | Emmert | 56/314 |
| 4,757,673 | A | * | 7/1988 | Gayman | 56/314 |
| 5,787,697 | A | * | 8/1998 | Post | 56/119 |
| 5,845,472 | A | * | 12/1998 | Arnold | 56/94 |
| 5,865,019 | A | * | 2/1999 | Hurlburt et al. | 56/119 |
| 5,910,092 | A | * | 6/1999 | Bennett | 56/119 |
| 6,247,297 | B1 | * | 6/2001 | Becker | 56/119 |
| 7,162,855 | B2 | * | 1/2007 | Boeckmann et al. | 56/15.2 |
| 7,395,651 | B2 | * | 7/2008 | Kost et al. | 56/119 |
| 2004/0107684 | A1 | * | 6/2004 | Slabbinck et al. | 56/119 |

FOREIGN PATENT DOCUMENTS

| EP | 0848898 A | 6/1998 |
| EP | 1036495 A1 * | 9/2000 |
| FR | 2192443 A | 2/1974 |

OTHER PUBLICATIONS

European Search Report dated Nov. 5, 2008 (4 pages).

* cited by examiner

*Primary Examiner*—Árpád Fábián-Kovács

(57) ABSTRACT

A corn head end fender is configured to tilt outwardly in a direction transverse to the direction of travel to provide access to a row unit covered by the end fender during normal operation.

9 Claims, 8 Drawing Sheets

TILT OUT CORN HEAD END FENDER

FIELD OF THE INVENTION

The invention relates to the end fenders for corn heads.

BACKGROUND OF THE INVENTION

Heads (or "headers") for agricultural harvesters are generally arranged as a horizontal frame extending perpendicular to the direction of travel through the field to which several row units are attached. The row units are devices that are aligned with each row of crops that the agricultural harvester approaches and are configured to gather and cut a row of crop plants.

Row units for corn heads (a typical example) may include two forwardly extending arms on which two endless gathering chains are attached. These gathering chains guide each cornstalk into a gap between the arms. Once between the arms, two counter-rotating stalk rolls engage the cornstalk therebetween, pulling it downward and stripping the ears of corn from the cornstalk. These ears of corn are swept backwards by the gathering chains into a trough at the rear of the corn head where a horizontal auger conveys them to the center of the corn head and a feeder house then conveys them to the combine harvester that supports the corn head and carried it through the field.

One problem with corn heads is the likelihood that they will become blocked or jammed, typically with crop material. When this happens, harvesting must stop until the affected row unit is cleaned out. These blockages or jams only occur when the vehicle is operating: in the middle of an agricultural field, far away from the operator's workshop.

It is important for the operator to clear the blockages in the row units and begin harvesting as soon as possible. Since the operator typically lacks a wide array of tools to disassemble the corn head, it is important that the different parts of the corn head be easily manipulated to provide rapid cleaning.

In conventional corn heads, the row units in the middle of the corn head are covered by lightweight roto-molded plastic points and covers (see e.g. FIGS. 1-2) which can be easily raised and lowered by a single operator to provide access to the row unit. The end row units, however, are not as easily cleared of blockages and jams. The two end fenders on the ends of the corn head covering the end row units require wrenches, screwdrivers, or other tools to remove them from the end row units and main frame of the corn head.

The weight of the traditional end fenders can be difficult for the operator to handle alone. In one arrangement, the end fender is supported on a hinge located at the upper rear of the end fender approximately 2 or 3 feet in the air. To remove the this end fender, the operator grasps the pointed front end of the end fender, lifts it several feet into the air, and walks it backward until it pivots up and over the rear wall of the corn head. Even though an end fender may be made of relatively lightweight materials, the need to lift it so high in the air can require two people.

What is needed is a new way of attaching the end fenders to the rest of the corn head that will permit a single operator to more easily move the end fender out of the way and provide access to the row unit that the end fender covers and protects. It is an object of this invention to provide such a new structure.

SUMMARY OF THE INVENTION

In accordance with a first aspect of the invention, an end fender for a corn head is provided, the end fender comprising a cover portion that extends generally fore-and-aft and covers a rear portion of a row unit; a point that extends generally fore-and-aft and is pivotally coupled to the forward end of the cover portion to pivot up and down about a generally laterally extending and horizontal axis and to cover a forward end of the row unit; a first hinge member which is fixed to the cover portion; and a second hinge member which is pivotally coupled to the first hinge member to pivot about a generally fore-and-aft extending hinge axis, wherein the second hinge member is fixed relative to a mainframe of the corn head.

The second hinge member may be fixed to the row unit, and the row unit may be fixed to the mainframe of the corn head. The end fender may further comprise a spring-loaded latch that couples the upper rear portion of the end fender to the mainframe of the corn head to maintain the end fender in a generally upright and vertical position during normal operation when engaged. The spring-loaded latch may include a spring pin mounted to the mainframe, and a latch member mounted to the cover portion, and the spring pin may be disengaged from the latch member by pulling a free end of the spring pin out of an aperture in the latch member against the force of a spring. The end fender may further comprise a spring-loaded latch that couples the front of the cover portion to the row unit, in order to maintain the end fender in a generally upright and vertical position during normal operation when engaged. The spring-loaded latch may comprise a spring pin mounted to the cover portion, and a latch member mounted to the row unit, and further the spring pin may be disengaged from the latch member by pulling a free end of the spring pin out of an aperture in the latch member against the force of the spring. The spring-loaded latch may be adapted to be automatically held in a spring-compressed and disengaged position without being held by the operator. The hinge axis maybe disposed adjacent to the row unit. The hinge axis maybe disposed generally parallel to and on the outside of a gathering chain of the row unit.

DETAILED DESCRIPTION OF THE PREFERRED EMBODIMENT

In the discussion below, "forward" or "front" refer to the normal direction of travel through a field during harvesting.

"Rear" or "backward" refer to the opposite direction. "Lateral" or "side-to-side" refer to directions that are generally horizontal and perpendicular to the normal direction of travel through a field during harvesting. "Outward" means in a direction laterally away from the body of the corn head.

Figure 1:
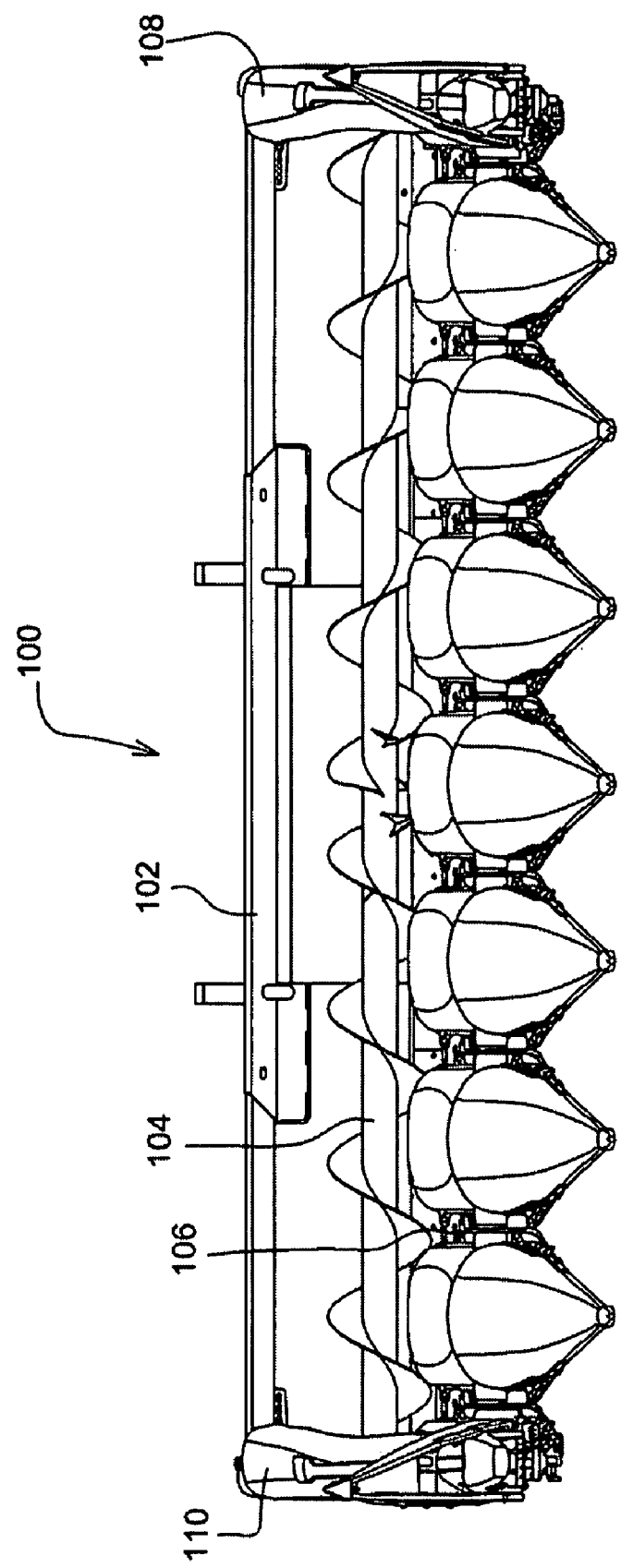
FIG. 1 is a front view of a corn head in accordance with the present invention having left and right end fenders showing those end fenders in an upright position with their points in a raised and latched position.
Figure 2:
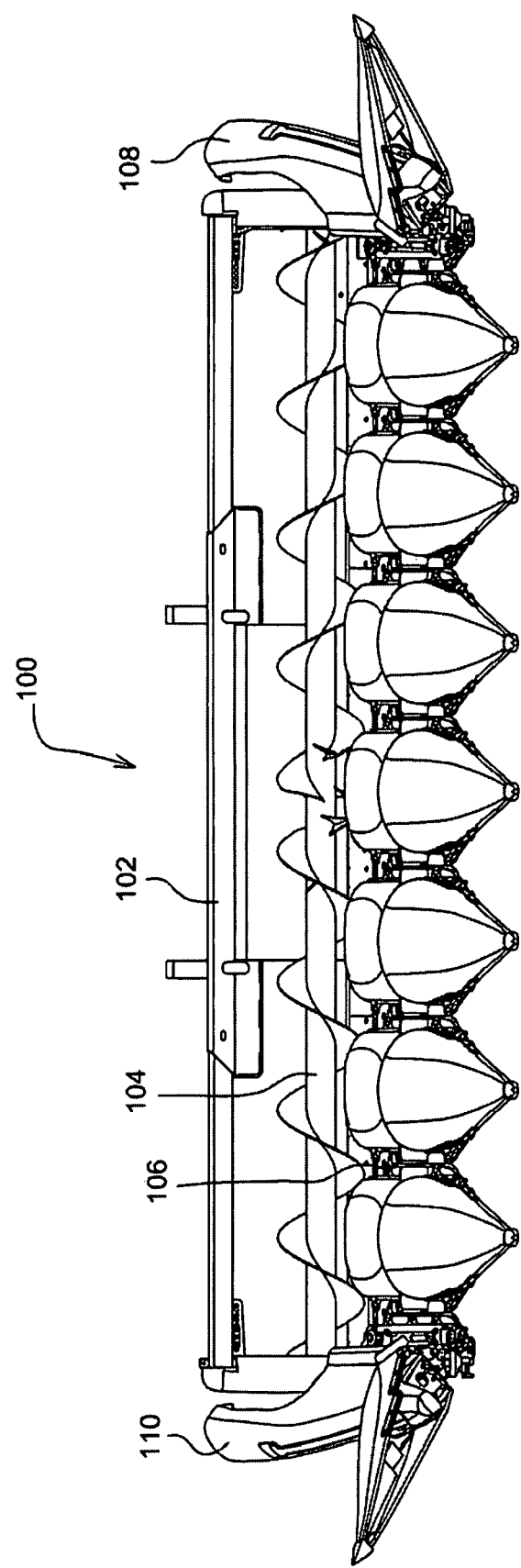
FIG. 2 is a front view of a corn head of FIG. 1 showing the left and right end fenders in an outwardly tilted position.

Referring now to FIGS. 1 and 2, a corn head is shown having a laterally extending main frame 102, a laterally extending auger 104, eight row units 106 disposed along the mainframe, and left and right end fenders 108, 110. The left and right end fenders are at the ends of the corn head covering a portion of the end row units and face outward from the very end of the corn head.

In FIG. 1, the left and right end fenders 108, 110 are in an upright, operating position. In FIG. 2, the left and right end fenders are pivoted outward about their respective hinges (not shown) for accessing row units 106 located underneath the end fenders. In all other respects, FIGS. 1 and 2 are identical. End fenders 108 and 110 are mirror images of each other, and therefore we shall only describe the right end fender 110.

Figure 3:
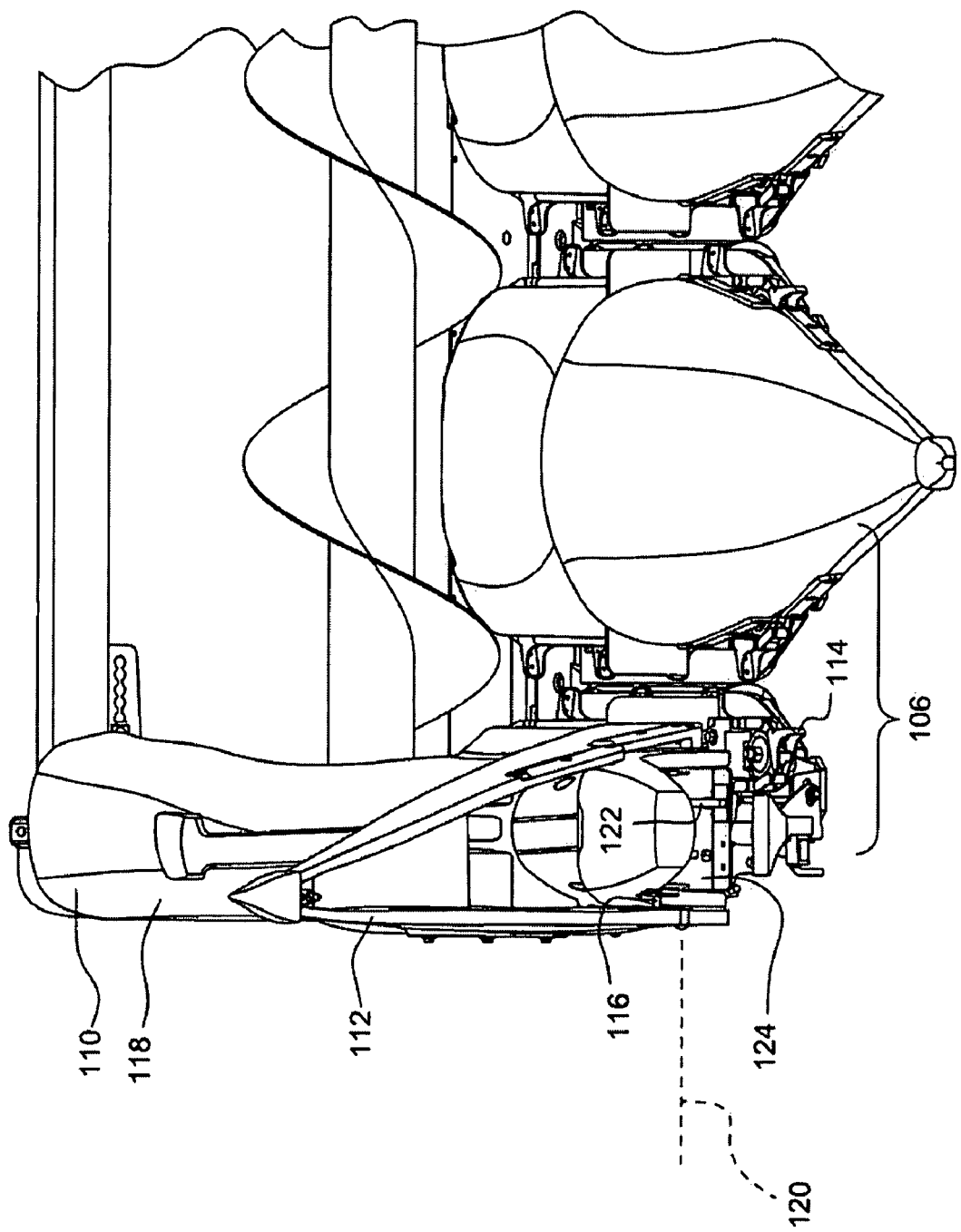
FIG. 3 is a close-up view of the right end of the corn head of FIG. 1.

Referring now to FIG. 3, the right end fender 110 is shown in an upright position with its point 112 raised. The right end fender covers the right side of the end row unit 106. When tilted outward, away from the corn head, it provides access to gathering chain 114 which is otherwise concealed underneath the right end fender 110. A latch assembly is provided to hold the point in a raised position with respect to the cover portion 118. A spring pin 116 extends between cover portion 118 of right end fender 110 and point 112 to hold point 112 in an upright position with respect to cover portion 118 as shown in all of the Figures herein. Point 112 is pivotally coupled to cover portion 118 to permit it to pivot upward with respect to cover portion 118 about a generally horizontal and laterally extending axis 120. A spring pin 122 is mounted on a support plate 124, which is in turn fixed to cover portion 118. Spring pin 122 extends into an aperture in receiver 126 fixed to end row unit 106 to hold the forward end of the end fender 110 in its latched and upright position as shown in FIG. 1 and FIG. 3.

Figure 4:
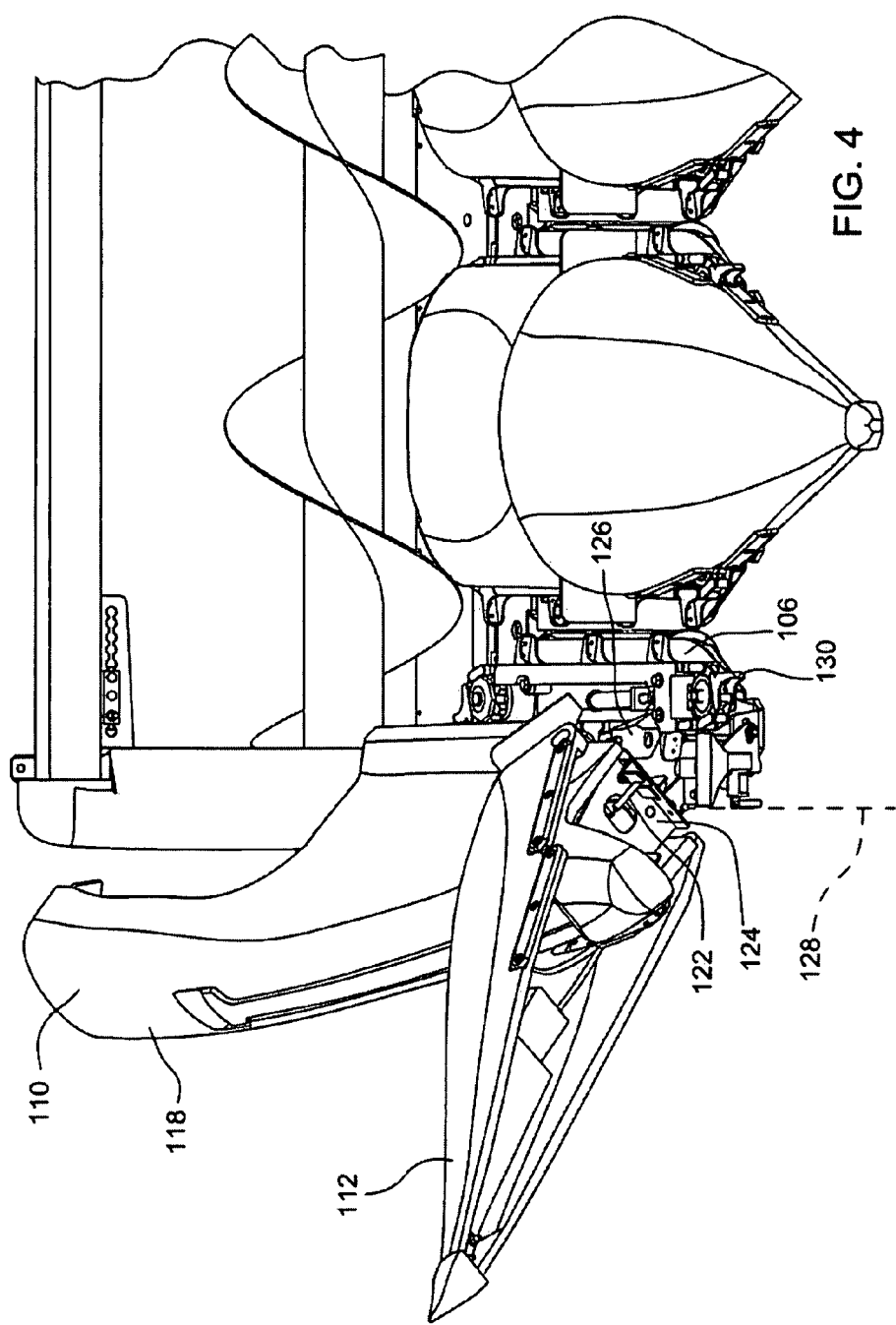
FIG. 4 is a close-up view of the right end of the corn head of FIG. 2.

FIG. 4 shows right end fender 110 in its unlatched and outwardly tilted position in which it provides access to the row unit 106 that it covers during harvesting operations. In this Figure, right end fender 110 has been tilted laterally to the right and away from its row unit 106, tilting about an axis 128 that extends generally fore-and-aft and lies in a generally horizontal plane that passes through gathering chain 130. By keeping the pivot point of the right end fender 110 so low, substantially all of its mass can be disposed above the pivotal axis 128, and the right end fender 110 can be pivoted outward to uncover the row unit without requiring that the operator lift it any significant distance. This permits easy operation by a single operator.

Figure 5:
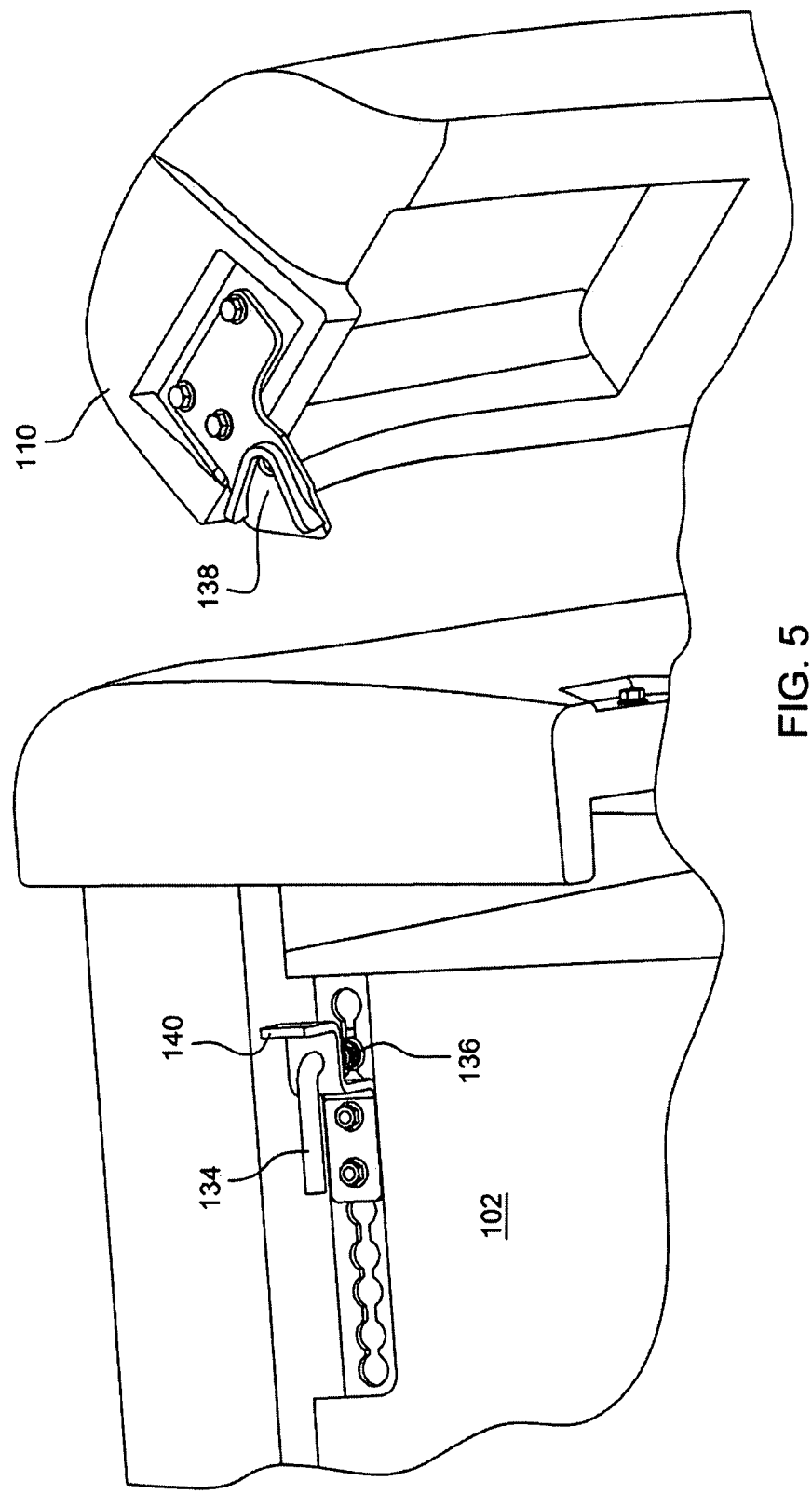
FIG. 5 is a rear perspective view of the right end of the corn head in FIGS. 2 and 4 showing the rear latch which is disposed at the top of the end fender.

FIG. 5 illustrates a latch assembly that holds the right end fender 110 in its upright and latched position. In FIG. 5, a spring pin 134 is affixed to the frame 102 of the corn head 100. Spring pin 134 is spring-loaded by a spring 136, which holds spring pin 134 in a forwardly extending position in which it engages an aperture in latch member 138, which is attached to the back of right end fender 110. To permit the right end fender 110 to be pivoted outward by a single operator, spring pin 134 can be manipulated by the operator to a position in which it is disengaged from latch member 138. To do this, spring pin 134 is pulled backwards (i.e. towards the viewer in FIG. 5) thereby compressing spring 136. Spring number 134 is L-shaped, and can be rotated when in this withdrawn position by 180° wherein it is supported in its withdrawn and disengaged position by bracket 140. With the rear latch in this withdrawn position, the operator can then circle around to the front of the corn head and disengage the front latch.

Figure 6:
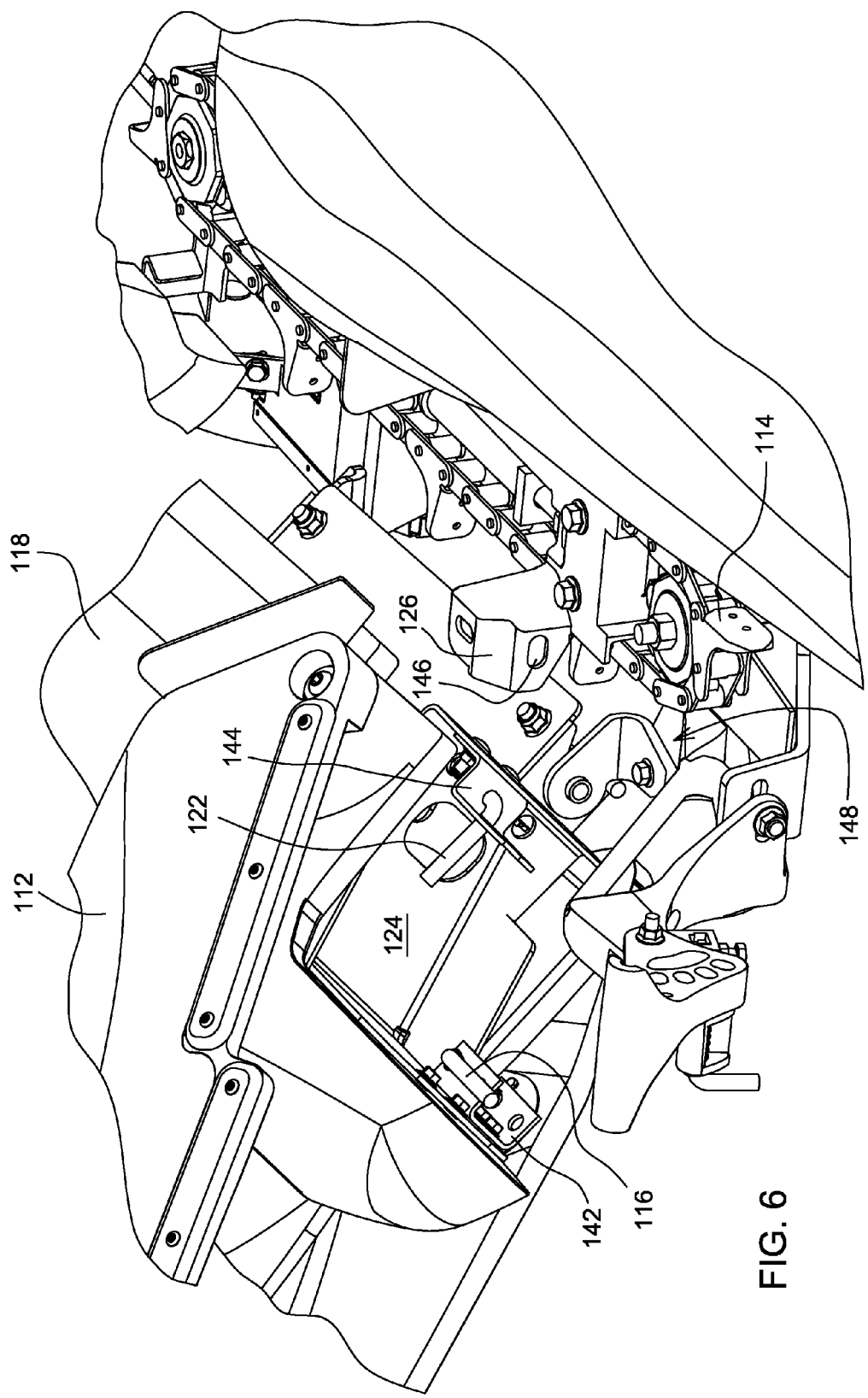
FIG. 6 is a downward front perspective view of the right end of the corn head of FIGS. 2, 4-5 showing details of the hinge.

FIG. 6 illustrates additional details of the front of cover portion 118. A bracket 142 is bolted to the underside of cover portion 118 and supports spring pin 116 for movement in a generally transverse direction. The end of spring pin 116 extends into an aperture (hidden by bracket 142) in point 112 when it the point 112 is in its upright position as shown in FIG. 6. Similarly, spring pin 122 is supported by a bracket 144 which is bolted to a second bracket 124 which is attached to cover portion 118. Spring pin 122 extends generally front to rear in the direction of travel and when it is in its spring biased position in engages an aperture 146 and receiver 126. FIG. 6 illustrates the hinge 148 that supports right end fender 110 when it is in its outwardly tilted position. Hinge 148 is better illustrated in the succeeding FIG. 7-8, from different perspective views.

Figure 7:
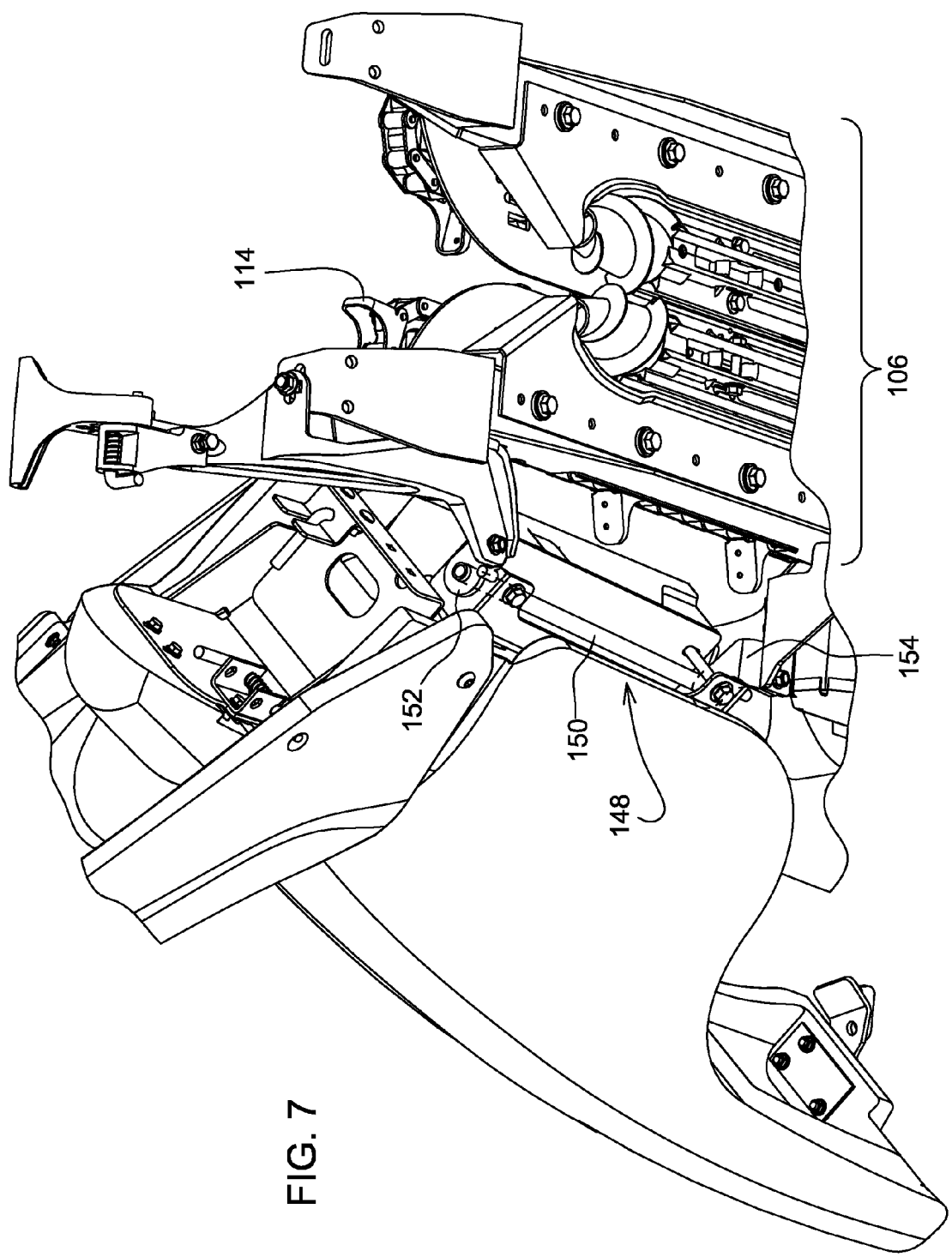
FIG. 7 is an upward front perspective view of the right end of the corn head of FIGS. 2, 4-6 showing more details of the hinge from the underside of the hinge.

FIG. 7 illustrates the hinge pin 150 itself, which is welded to bracket 152 at its forward end and bracket 154 at its rear end. Brackets 152 and 154, in turn, are bolted to row unit 106. Thus, hinge 148 is supported on row unit 106.

Figure 8:
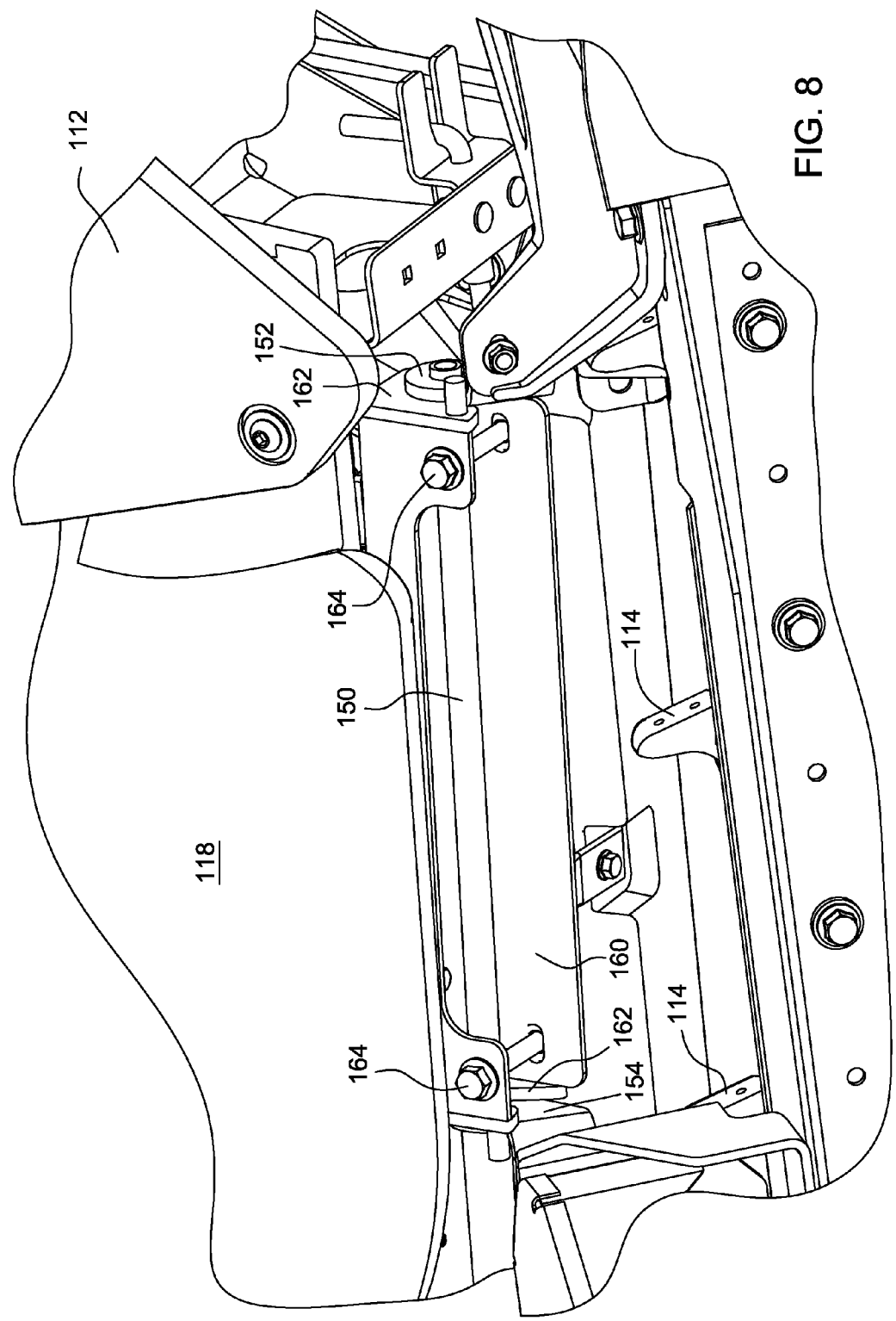
FIG. 8 is a upward side perspective view of the right end of the corn head of FIGS. 2, 4-7 showing additional details of the hinge.

FIG. 8 illustrates how the hinge pin 150 is pivotally coupled to cover portion 118. In particular, elongated bracket 160 is bolted to the underside of cover portion 118. The elongated bracket 160 extends fore-and-aft and surrounds hinge pin 150. At either end of elongated bracket 160 are saddle brackets 162 that have a U-shaped aperture that opens downward. These U-shaped apertures receive opposite ends of hinge pin 150. Hinge pin 150 is retained within the U-shaped apertures by bolts 164 that extend transversely with respect to hinge pin 150 and prevented from being withdrawn from the U-shaped apertures at each end of elongated bracket 160. Hinge pin 150 is free to pivot within the U-shaped apertures, which in turn permits the right end fender 110 to pivot about hinge pin 150 with respect to the corn head 100.

The invention claimed is:

1. An end fender for a corn head, comprising:
    a cover portion that extends generally fore-and-aft, covers a rear portion of a row unit and forms an outermost side wall of the corn head;
    a point that extends generally fore-and-aft and is pivotally coupled to a forward end of the cover portion to pivot up and down about a generally laterally extending and horizontal axis with respect to the cover portion and to cover a forward end of the row unit;
    a first hinge member which is fixed to the cover portion; and
    a second hinge member which is pivotally coupled to the first hinge member to permit the first hinge member and the cover portion to pivot about a generally fore-and-aft extending hinge axis, the second hinge member is fixed relative to a mainframe of the corn head.

2. The end fender for a corn head of claim 1, the second hinge member is fixed to the row unit, and the row unit is fixed to the mainframe of the corn head.

3. The end fender for a corn head of claim 1, further comprising a spring-loaded latch assembly that couples an upper rear portion of the cover portion to the mainframe of the corn head, to maintain the end fender in a generally upright and vertical position during normal operation when engaged.

4. The end fender for a corn head of claim 3, the spring-loaded latch assembly includes a spring pin mounted to the mainframe, and a latch member mounted to the cover portion, and further the spring pin can be disengaged from the latch member by pulling a free end of the spring pin out of an aperture in the latch member against the force of a spring.

5. The end fender for a corn head of claim 1, further comprising a spring-loaded latch assembly that couples the front of the cover portion to the row unit, to maintain the end fender in a generally upright and vertical position during normal operation when engaged.

6. The end fender for a corn head of claim 5, the spring-loaded latch assembly includes a spring pin mounted to the cover portion, and a latch member mounted to the row unit, and further the spring pin can be disengaged from the latch member by pulling a free end of the spring pin out of an aperture in the latch member against the force of the spring.

7. The end fender for a corn head of claim 4, the spring-loaded latch assembly is adapted to be automatically held in a spring-compressed and disengaged position without being held by the operator.

8. The end fender for a corn head of claim 1, the hinge axis is disposed adjacent to the row unit.

9. The end fender for a corn head of claim 8, the hinge axis is disposed generally parallel to and on the outside of a gathering chain of the row unit.

* * * * *